July 21, 1925.  
C. B. McAULAY  
BUTTERFLY VALVE  
Filed Aug. 5, 1924  
1,546,594  
2 Sheets-Sheet 1

July 21, 1925.

C. B. McAULAY

BUTTERFLY VALVE

Filed Aug. 5, 1924

INVENTOR
C.B. McAulay
BY
Harry N Totten
ATTORNEY

Patented July 21, 1925.

1,546,594

UNITED STATES PATENT OFFICE.

CHESTER B. McAULAY, OF PALO ALTO, CALIFORNIA.

BUTTERFLY VALVE.

Application filed August 5, 1924. Serial No. 730,233.

*To all whom it may concern:*

Be it known that I, CHESTER B. McAULAY, a citizen of the United States, residing at Palo Alto, in the county of Santa Clara and State of California, have invented certain new and useful Improvements in Butterfly Valves, of which the following is a specification.

The present invention relates to improvements in disk or butterfly valve constructions whereby when the valve is in closed position a water tight joint can be maintained between the periphery of the valve and its seat.

The principal object of the invention is to provide an adjustable joint connection between co-operating surfaces carried by the valve and its casing, one or more thereof being capable of adjustment to admit of the closing of the valve and then of operation to afford a tight seat.

The invention consists primarily in co-operating rings, one constituting a seat ring and one adapted for forcing toward the other to admit of a tight joint between the valve and seat.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings forming a part of this application and illustrating the preferred embodiment of the invention, Fig. 1 is a transverse horizontal sectional view through a valve casing illustrating the valve in closed position.

Fig. 3 is a view in detail of the ring construction illustrating the ring carried by the casing as being adjustable.

Figure 1:
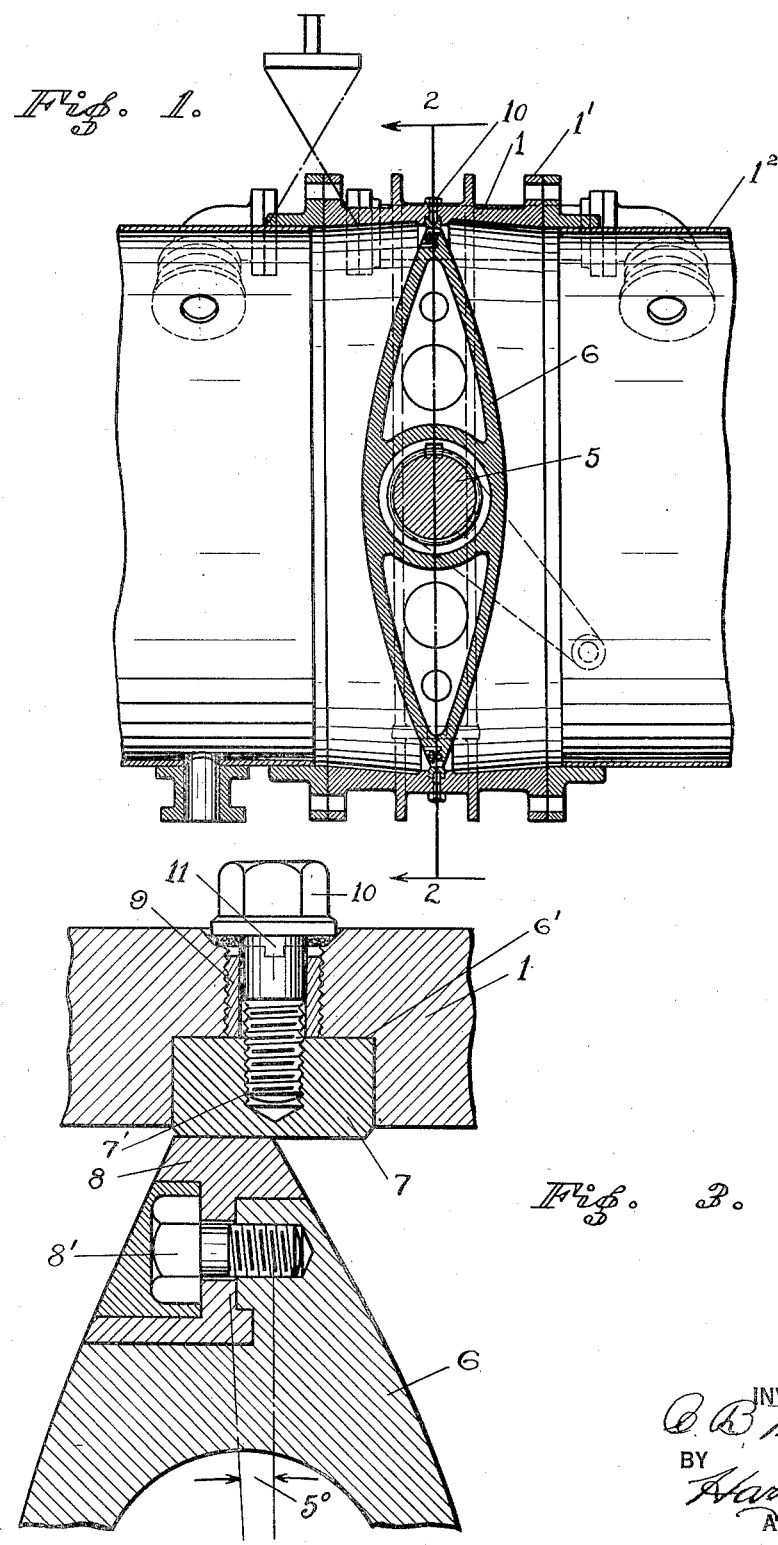

Referring to the drawings wherein like characters of reference designate corresponding parts, 1 indicates an annular valve casing formed with flanged ends 1' for attachment to pipe line sections $1^2$. The casing is formed at diametrically opposed points with annular projections 2 into which bushings 3 are fitted, the bushings carrying stuffing box 4 of conventional construction. A valve shaft 5 is rotatably mounted in the bushings 3 with one end extended therefrom and preferably provided with an arm or lever 5', for connection with operating means of suitable size and power commensurate with the size of the valve. The shaft 5 mounts within the casing 1 to rotate with the shaft a disk or butterfly 6 having a true peripheral diameter to conform with the configuration of the true inner diameter of the casing 1, the diameter of the valve being such that when the same is in closed position, extending across the casing, it assumes a slight angle with its perpendicular. It will be observed that the rotation of the shaft 5 swings the valve either at right angles to or in a plane parallel with the casing axis, in which latter position the valve is open. It will be observed from the drawings that the valve is of greatest thickness at its center and tapers radially to its periphery, this stream line construction affording little resistance to or disturbance in the flowing water, particularly when the valve is in full open position.

In the construction illustrated in the drawings, the casing is formed with a groove 6' in which is mounted a seat ring 7 and also that the periphery of the disk is grooved or fashioned to receive a nose ring 8, these two ring features, in their simplest form, being common to butterfly valve constructions as at present manufactured.

Figure 2:
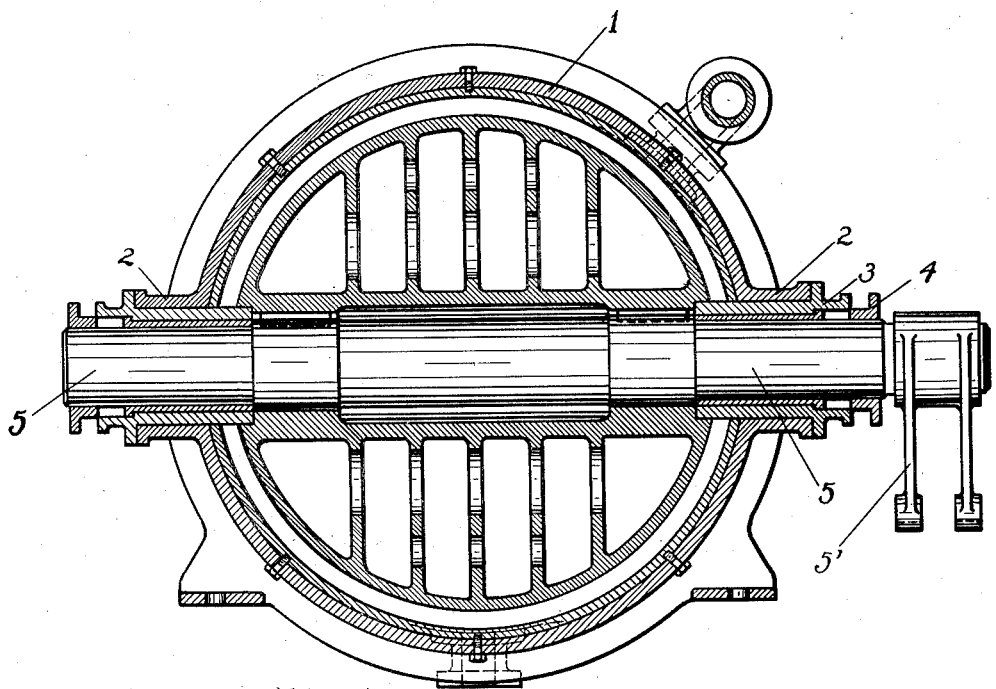
Fig. 2 is a transverse sectional view taken on line 2—2 of Fig. 1 illustrating the valve in closed position.

Referring particularly to Figs. 1, 2 and 3, it will be observed that the nose ring 8 is detachably secured to the periphery of the valve 6 by bolts 8' and is non-expansible, and that the seat ring 7 has formed in its rear surface threaded openings 7' for receiving the threaded end of threaded cap screws 10. These threaded cap screws 10 extend through the central smooth bore of threaded jack screws 9 which have threaded engagement with the correspondingly threaded wall 9' of openings extending radially through the casing 1 in rear of the seat ring 7. The cap screws 10 and jack screws 9 are operated in the following manner:

When the valve is first received from the manufacturer or from time to time as wear takes place—with the valve in the closed position and while under water pressure, cap screws 10 are withdrawn from the jack screws 9 and thereafter the jack screws are rotated by inserting a suitable implement in the slots 11 thereof to force the ring 7 closely into engagement with the nose ring 8, but not so tightly as to prevent the valve from being operated. This adjustment compensates for stretch of the casing 1 or irregularities due to machine fitting and reduces leakage.

Cap screws 10 are inserted to move the seat ring 8 out of seating position and to prevent the same from moving after adjustment.

Figure 4:
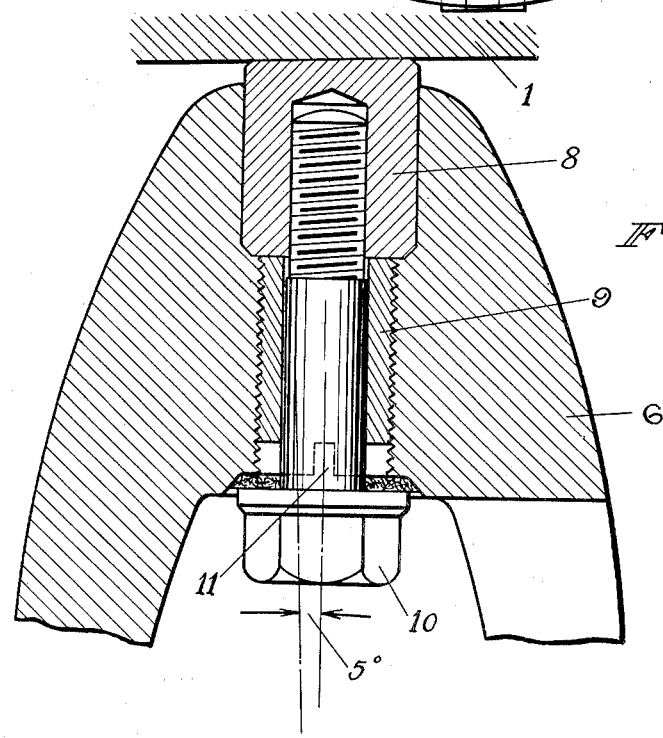
Fig. 4 is a view in detail illustrating a ring construction with the ring carried by the butterfly as being adjustable.

In the modified construction, Fig. 4, the seat ring may be eliminated and the nose ring 8 may be adjustably mounted by the same type and kind of cap screws 10 and jack screws 9 as are employed in the construction illustrated in Figs. 1 to 3, inclusive. In the modified form, after the valve is closed, the attendant gains access to the down-stream side of the valve and manipulates the cap screws 10 and jack screws 9 in such manner, as previously explained, as to force the nose ring into water tight engagement with the casing wall 1, or if advisable the seat ring 7 may be employed.

I claim:

1. A valve structure comprising a valve casing, a butterfly valve rotatably mounted therein to close the passage through the casing, a ring member constituting the engaging face when said valve is in closed position and against which the cooperating face or surface of the opposing member is adapted to contact in edge to edge relation, means for moving said ring to permit the closing of the butterfly and means disposed concentrically of the first means for forcing the ring on the closing of the butterfly into contact with its cooperating seat surface.

2. A valve structure comprising a valve casing, a butterfly valve therein rotatably mounted to close the passage through the casing, a closure ring, a plurality of cap screws threadably engaging the closure ring, a plurality of jack screws through which the cap screws pass and threadably engaging a fixed support whereby the adjustment of the cap screws withdraws the ring to permit the movement of the valve into or from closed position, and an adjustment of the jack screws forces the ring into engaging position with its cooperating surface.

3. A valve structure comprising a valve casing, a butterfly valve rotatably mounted therein to close the passage through the casing, a ring member constituting the engaging face when said valve is in closed position and against which the cooperating face or surface of the opposing member is adapted to contact in edge to edge relation, means for moving said ring to permit the closing of the butterfly, and a plurality of means disposed about the ring for forcing the ring on the closing of the butterfly into contact with is cooperating seat surface.

4. A valve structure comprising a valve casing, a butterfly valve rotatably mounted therein to close the passage through the casing, a ring member constituting the engaging face when said valve is in closed position and against which the cooperating face or surface of the opposing member is adapted to contact in edge to edge relation, means for moving said ring to permit the closing of the butterfly, and means disposed longitudinally of the ring and bearing at substantially the same points thereon for forcing the ring on the closing of the butterfly into contact with its cooperating seat surface.

In testimony whereof I have signed my name to this specification.

CHESTER B. McAULAY.